UNITED STATES PATENT OFFICE.

HEISHICHI SUZUKI, OF SHIBAKU, TOKYO, JAPAN.

PROCESS FOR WELDING COPPER.

1,107,865.  Specification of Letters Patent.  Patented Aug. 18, 1914.

No Drawing.  Application filed August 2, 1913. Serial No. 782,558.

*To all whom it may concern:*

Be it known that I, HEISHICHI SUZUKI, subject of the Emperor of Japan, residing at No. 15 Hamamatsucho Itchome, Shibaku, Tokyo, Japan, have invented certain new and useful Improvements in Processes for Welding Copper, of which the following is a specification.

*Outline of the nature and object of the process.*—In this process, a closed vessel having the bottom covered with charcoal, should be prepared in a furnace, and the pieces of copper to be welded are placed and heated in this vessel, keeping the welding surfaces in contact in the ordinary way, but the contact surfaces should be polished and cleaned, before placing the pieces in the furnace. At a proper heat the pieces are taken out and welded quickly in the usual way.

The object of this process is to obtain a perfect welding of copper, preventing the oxidation of welding surfaces by gases produced by carbon in the closed vessel and keeping the copper in pure state on the surfaces; and also, as the bottom of the vessel is covered with charcoal, the pieces do not touch the internal wall of the closed vessel which is strongly heated, and the pieces being heated by conduction of heat through charcoal, they will not easily and partially be melted by unequal heat.

As the temperature of the vessel can be raised as required, the specimen will be heated in a short time and the quality of copper will not be altered, giving no bad influence in heat treatment, so it makes practice easy and perfect.

*The full description of the invention.*—To weld copper pieces by this process, a heating vessel, or so called muffle, made of refractory material is placed in a furnace, and the vessel is closed with a cover to prevent air and hot gases entering it.

The bottom of the vessel is prepared with the pieces of charcoal in a proper thickness and specimens are placed on this charcoal bed, and the outside of the vessel is heated in the furnace.

The welding surfaces of the specimen should be polished or cleaned by acid solution, and the pieces put together, before placing them in the vessel. If the specimen consists of several pieces and is to be welded to one, the pieces should be tied together. Then the specimen is heated on the charcoal bed, but every piece of the specimen should never be allowed to touch the interior wall of the vessel.

When the specimens are at a proper welding heat, they are taken out and quickly hammered or rolled in the ordinary way. In welding, the lower but fit for welding heat gives the better result and ammonium carbonate or ammonium chlorid may be used as a welding compound, but it is not necessary to use them when this new process is carried out with care, in which case perfect welding can be done.

In this invention, as the copper specimens are placed on charcoal bed and heated in the closed vessel, the oxygen in air in the vessel will combine with highly heated carbon and form carbonic acid and carbon monoxid, at last no oxidizing gas staying in the vessel; therefore the specimens are not oxidized but will rather be purified by reducing action of heated carbon monoxid, resulting in perfect welding.

As the specimens are placed on charcoal bed, they do not come in contact with the heated wall of the vessel and uniform heat is given by conduction through charcoal; especially, in the case of small pieces, this process is favorable, as they will not easily melt or change the quality thereof if the pieces are placed near the wall. The vessel being heated much stronger than the necessary heat for welding, the specimen can be uniformly heated in a short time, so the short comings in the ordinary furnace, may be dispensed with, in which is taken a long time in heating the specimen and the crystallization of copper may be roughened or make the specimen brittle by impurities, to say nothing of the oxidizing action. This is a very important fact in practice, and for the instruments or machines using copper like electric machinery the process is most advantageous for welding copper plates and wires. For instance, in the electric railway bond that is an electric conductor manufactured by piling up sheet copper and welding the both ends, leaving the middle part unwelded so as to keep them elastic, the sheets are first cut into required size, piled up after polishing their surfaces, tied with wire and then put into a furnace to weld the edges. If the ordinary open hearth furnace is used for heating this electric conductor, the surfaces of every sheet will be oxidized and the edges of the outside sheets melted by unequal heat caused by blast, or the surfaces will be covered with charcoal dust and ashes, and the sheet will become unfit for welding. And if the conductor is heated in a muffle free from blast and without preparing charcoal bed the surfaces of the specimens will be covered with scales at red heat and oxidizing action may clearly be observed, which makes perfect welding very difficult unless welding compound is used to remove the scales. Moreover if a part of the specimen touches the wall of the vessel that part melts or changes quality quicker than the other part. But in the present process the above defects do not exist. By peeping in the interior from a gap made by slightly lifting the cover of the vessel no scaly aspect or oxidizing action can be seen but a fire glow throughout the interior of the vessel. As the air entering through the gap or opening acts on the charcoal at the mouth of the opening, the surface of the charcoal gives out slightly scaly sparkles, but the important part of the vessel for welding is not affected by the air, for no oxidation takes place, and the copper sheets will be perfectly welded by a proper hammering. In electric welding, sometimes non-oxidizing gas like hydrogen is used for preventing oxidation, and it is a known fact to cover the metal surface with charcoal dust for the same purpose. But the first method is not practical, as it is very expensive and troublesome to install.

In the present invention, such non-active gases as carbonic acid or carbon monoxid are spontaneously formed by the carbon in the vessel, so the oxidation of copper specimen may be prevented by very simple means and small cost.

In carrying out the process, care must be taken not to use up the charcoal and to regulate the temperature, for if the temperature is too low the specimen will not be perfectly welded, while on the other hand, if the heat is too high the copper will become brittle and can not be used for practical purposes though it may be welded; therefore the specimen should be taken out at the proper welding heat. To gage the correct time the vessel must be frequently observed from under the lifted cover or through a hole during which time air is introduced into the vessel through the gap. But in the present process, if air enter the vessel oxygen will be removed by red heat carbon at the opening and gives no effect to the inside of the vessel and the surfaces of the specimen are kept clean, thus oxidation can be prevented by a simple means.

The charcoal in the vessel burns very slowly, and the vessel is kept at a constant temperature and uniform heat, preventing direct contact between copper and wall; and also the temperature of the vessel being kept much higher than welding point, the heating time can be shortened, and the pieces will be heated uniformly, without melting or altering the quality of copper. These are distinctive advantageous points of this process.

Claim:

1. A process for welding copper which consists in heating the specimens previously polished on their welding surfaces in a closed vessel heated exteriorly, the specimens being laid on a layer of charcoal, and in quickly hammering the specimens after withdrawal from the vessel at a suitable temperature.

2. A process for welding copper which consists in polishing the welding surfaces, coating the same with a welding compound and then placing the specimens on a layer of charcoal within a closed vessel heated from the exterior; the specimens being withdrawn at a welding heat and hammered.

In testimony whereof I affix my signature in presence of two witnesses.

HEISHICHI SUZUKI.

Witnesses:
H. F. HAWLEY,
S. FORISGA.